United States Patent
Chiu (10) Patent No.: US 7,392,333 B2
(45) Date of Patent: Jun. 24, 2008

(54) FIBRE CHANNEL ENVIRONMENT SUPPORTING SERIAL ATA DEVICES

(75) Inventor: David Chih-Wei Chiu, Fremont, CA (US)

(73) Assignee: Xyratex Technology Limited, Havant, Hampshire (GB)

( * ) Notice: Subject to any disclaimer, the term of this patent is extended or adjusted under 35 U.S.C. 154(b) by 147 days.

(21) Appl. No.: 11/000,769

(22) Filed: Nov. 30, 2004

(65) Prior Publication Data

US 2006/0168371 A1 Jul. 27, 2006

(51) Int. Cl.
G06F 13/38 (2006.01)
G06F 13/00 (2006.01)

(52) U.S. Cl. ............................... 710/62; 710/65; 710/5; 710/11; 710/72; 709/230

(58) Field of Classification Search ...................... 710/5, 710/11, 62–66, 72; 711/112–114; 709/230–237
See application file for complete search history.

(56) References Cited

U.S. PATENT DOCUMENTS

| | | | | |
|---|---|---|---|---|
| 5,454,098 A | * | 9/1995 | Pisello et al. .................. 703/24 |
| 6,832,288 B2 | * | 12/2004 | Ohta et al. .................... 711/112 |
| 6,970,974 B2 | * | 11/2005 | Isobe et al. ................... 711/114 |
| 7,003,689 B2 | * | 2/2006 | Arakawa ......................... 714/8 |
| 7,124,234 B2 | * | 10/2006 | Marushak et al. ............ 710/316 |
| 2004/0199515 A1 | * | 10/2004 | Penny et al. .................... 707/10 |
| 2005/0138154 A1 | * | 6/2005 | Seto ............................ 709/223 |
| 2006/0095649 A1 | * | 5/2006 | Netter et al. ................. 711/103 |
| 2006/0218322 A1 | * | 9/2006 | Hoese et al. ................... 710/62 |

\* cited by examiner

*Primary Examiner*—Christopher Shin
(74) *Attorney, Agent, or Firm*—Charles F. Raidelbach, Jr.

(57) ABSTRACT

A system and method in a fibre channel environment supporting serial ATA devices. In one embodiment, the system and method includes a network having a plurality of servers and a plurality of fiber-channel devices connected to each other through the network. In another embodiment, a command arbitrator answers at least one non-media access command received from a transmitting server. Furthermore, a buffer may store a first consecutive write command for a first time interval and a second consecutive write command for a second time interval if the first time interval has not expired in one embodiment. In addition, a reset command may be generated if at least a first and a nth retry request for a failed command is unsuccessful, in one embodiment.

30 Claims, 7 Drawing Sheets

FIG. 7

FIBRE CHANNEL ENVIRONMENT SUPPORTING SERIAL ATA DEVICES

FIELD OF INVENTION

The field of invention relates to fibre channel networks; and, more specifically, to data translation between fibre channel devices and Serial Advanced Technology Attachment (SATA) devices.

BACKGROUND

Fibre channel is a high performance serial link supporting its own, as well as higher-level protocols such as the Fiber Distributed Data Interface (FDDI), Small Computer System Interface (SCSI), High-Performance Parallel Interface (HIPPI), and Internet Policy Institute (IPI) protocols. Fibre channel is often used as a transport mechanism in storage area networks (SANs) in which personal computers and servers are connected to storage devices and other peripherals through a fibre channel transport. By moving storage to a SAN, administrators have the means and the bandwidth to share and allocate storage to a much larger audience on a network. The fibre channel transport mechanism is used because it allows for fast transfers of large amounts of information to and from nodes of a SAN.

Serial Advanced Technology Attachment (serial ATA) devices (e.g., SATA hard drives) are typically used as storage devices in personal computers. Consequently, serial ATA devices are manufactured in very high volumes. Fibre channel devices (e.g., specialized fibre channel hard drives based on the SCSI standard) are manufactured in low volumes, because they are primarily used in SAN environments. As a result, serial ATA devices tend to be less costly than fibre channel devices because of reasons including the economies of scale achieved through higher volume production of serial ATA devices. For example, component costs for serial ATA devices typically cost 3-5 times less than the cost of components for fibre channel devices. Furthermore, serial ATA is a serial link that includes a single cable with a minimum of four wires to create a point-to-point connection between devices. Transfer rates for serial ATA begin at 150 MBps. One of the main design advantages of serial ATA is a thinner serial cable that facilitates more efficient airflow inside a form factor and also allows for smaller chassis designs.

Serial ATA devices cannot work in environments where fibre channel is used as a transport mechanism, because the fibre channel standard does not support serial ATA protocols. As such, administrators are forced to learn and maintain support for both fibre channel devices and serial ATA devices. Since SAN and fibre channel devices form a "network behind the server", different from a typical Ethernet network, training and management costs are not leveraged off the resources required for maintaining the typical Ethernet network. Furthermore, administrators are unable to use more cost effective serial ATA devices in a fibre channel environment. As such, administrators are unable to realize cost savings of serial ATA devices in a fibre channel environment.

SUMMARY

A system and method in a fibre channel environment supporting serial ATA devices. In one aspect, the system and method includes a network having a plurality of servers and a plurality of fiber-channel devices connected to each other through the network. In another aspect, a controller is connected to the network having a translation module to convert back and forth between fibre channel frames received through the network from one or more of the plurality of servers and SATA packets. In another aspect, serial ATA devices are coupled to the network through the controller to generate and to receive the SATA packets. In another aspect, a command arbitrator answers at least one non-media access command received from a transmitting server. Furthermore, a buffer may store a first consecutive write command for a first time interval and a second consecutive write command for a second time interval if the first time interval has not expired in one aspect. In addition, in one aspect, a reset command may be generated if at least a first and a nth retry request for a failed command is unsuccessful.

FIGURES

The present embodiments are illustrated by way of example and not limitation in the figures of the accompanying drawings in which like references indicate similar elements, and in which.

DETAILED DESCRIPTION

A system and method in a fibre channel environment supporting serial ATA devices are described. In the following description, for purposes of explanation, numerous specific details are set forth in order to provide a thorough understanding of the present invention. It will be evident, however, to one skilled in the art that the present invention may be practiced without these specific details.

Figure 1:
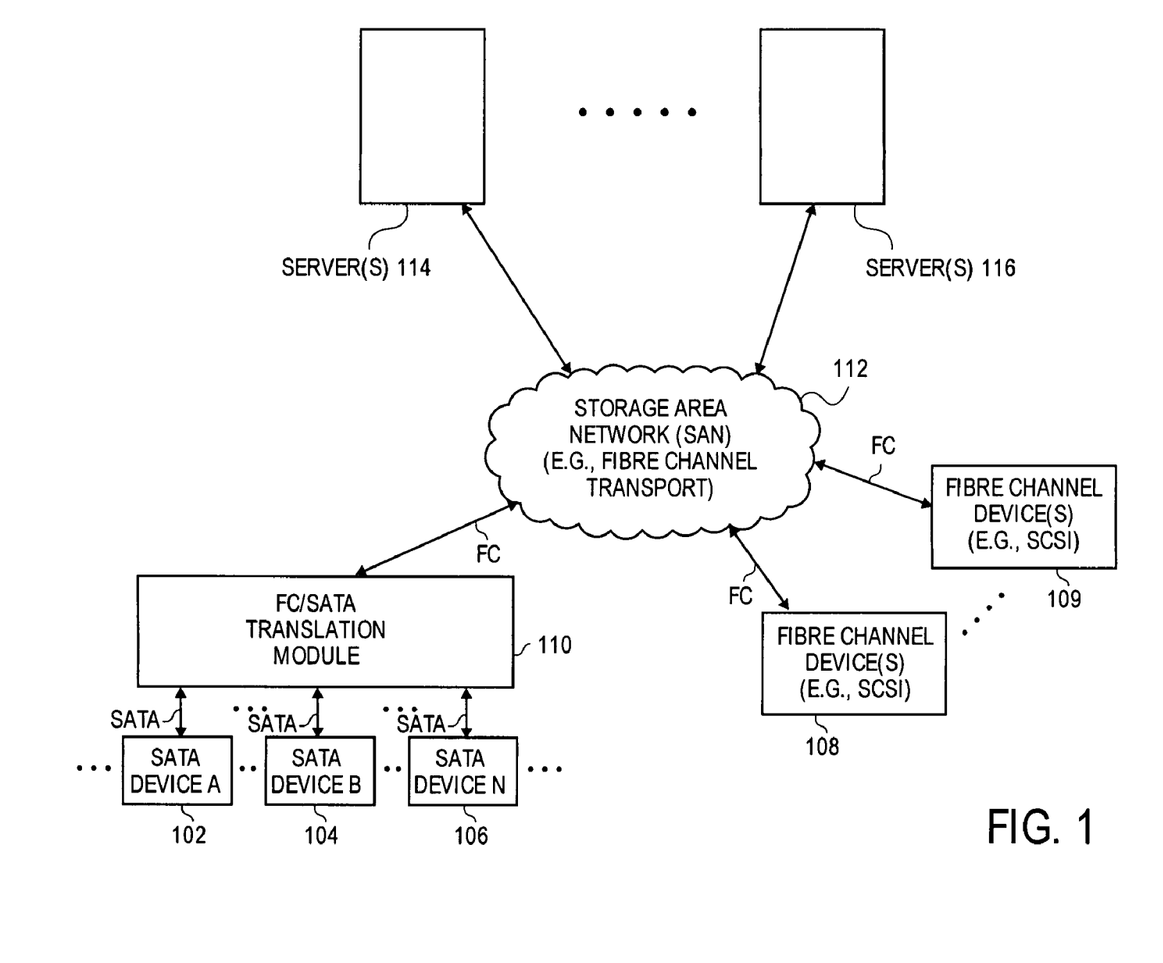
FIG. 1 is a storage area network having a FC/SATA translation module that allows a number of serial ATA devices to communicate with servers and fibre channel devices through a fibre channel transport, according to one embodiment.

FIG. 1 is a storage area network having a FC/SATA translation module 110 that allows a number of serial ATA devices 102, 104, and/or 106 to communicate with server(s) 114-116 and fibre channel devices 108-109 through a fibre channel transport, according to one embodiment. In FIG. 1, a SATA device 102, a SATA device 104, and a SATA device 106 are connected to a storage area network (SAN) 112 through a FC/SATA translation module 110. In one embodiment, the FC/SATA translation module 110 is part of a controller card inside of an external chassis that houses the SATA devices 102, 104, and/or 106. In another embodiment, the FC/SATA translation module 110 is within an intermediate node within SAN 112. An embodiment of the FC/SATA translation module 110 will be described in more detail further below with respect to FIG. 2. The SATA devices 102, 104, and/or 106 may be hard drives, non-volatile storage devices, volatile storage devices, SATA based peripherals, and/or any other type of SATA based device.

In FIG. 1, one or more servers (e.g., a server(s) 114 and a server(s) 116) and one or more fibre channel devices (e.g., a fibre channel device(s) 108 and a fibre channel device(s) 109) are also communicatively connected to the SAN 112. As such, the server(s) 114 may communicate with the SATA devices 102, 104, and/or 106 (e.g., SATA based serial ATA hard drives) through the FC/SATA translation module 110 and may communicate with the fibre channel device(s) 108-109 (e.g., fibre channel based SCSI hard drives) directly through the SAN 112 without using the FC/SATA translation module 110.

The SAN 112 may work through a fibre channel transport (e.g., a high-speed transport technology used to build storage area networks) in one embodiment. The fibre channel transport may be configured point-to-point, via a switched topology or an arbitrated loop (FC-AL) with or without a hub. In another embodiment, the fibre channel transport can support up to 127 nodes. In one embodiment, the fibre channel transport supports transmission rates up to 2.12 Gbps in each direction, and 4.25 Gbps is expected. In one embodiment, the storage network shown in FIG. 1 forms a system in which a controller (not shown) connected to the SAN 112 (e.g., a network) includes the FC/SATA translation module 110. In addition, the FC/SATA translation module 110 may convert back and forth between fibre channel frames received through the SAN 112 from one or more of the plurality of server(s) 114 and 116 and SATA packets understandable by the SATA devices 102, 104, and/or 106.

Figure 2:
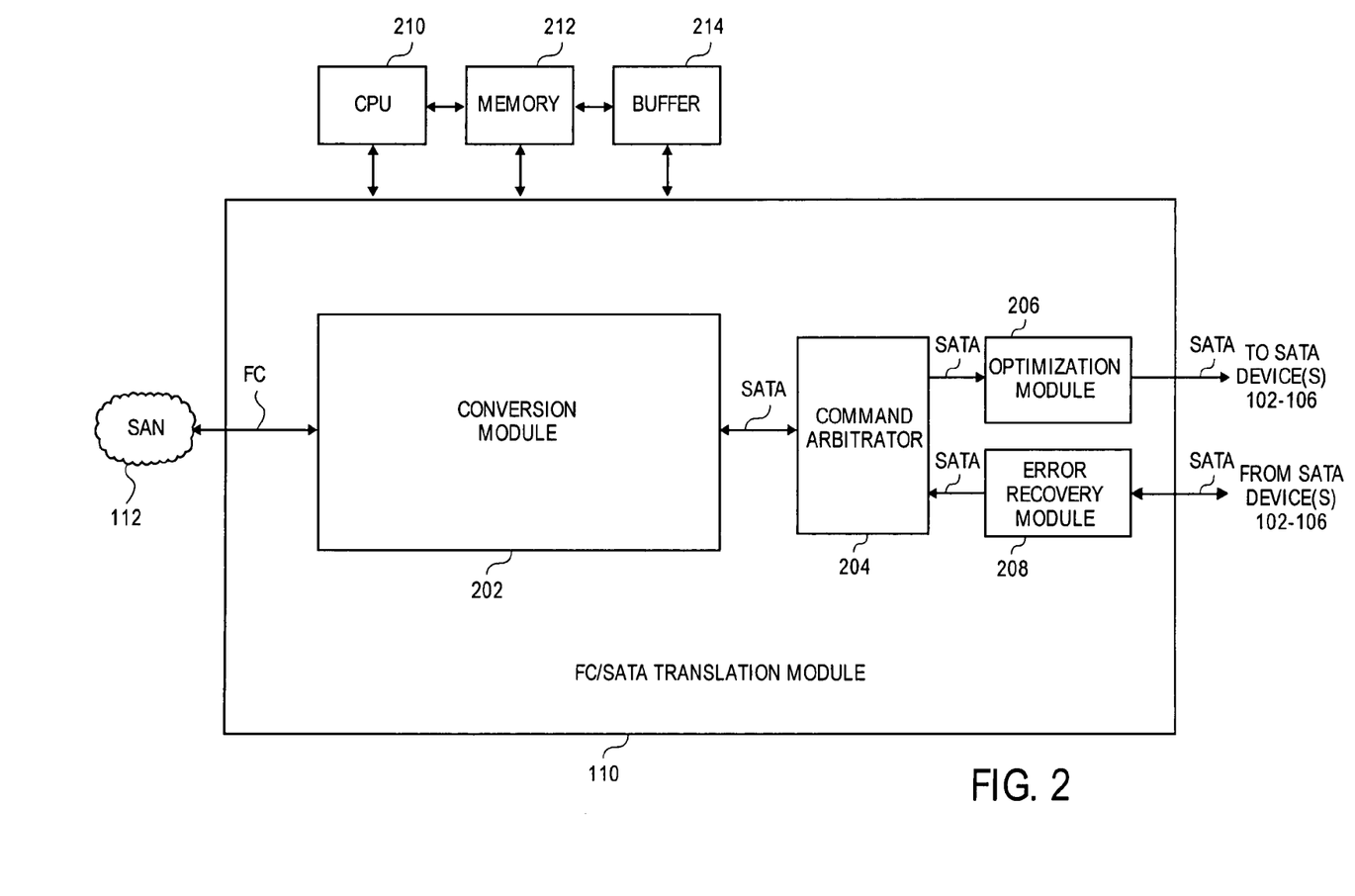
FIG. 2 is a block diagram of a FC/SATA translation module having a conversion module, a command arbitrator, an optimization module, and an error-recovery module, according to one embodiment.

FIG. 2 is an exploded view of an embodiment of an embodiment of the FC/SATA translation module 110 of FIG. 1. The FC/SATA translation module 110 includes a conversion module 202, a command arbitrator 204, an optimization module 206, and an error-recovery module 208, according to one embodiment. A central processing unit (CPU) 210, a memory 212, and a buffer 214 are connected to the FC/SATA translation module 110. In one embodiment, the CPU 210, the memory 212, and the buffer 214 may form the computer system 700 as later described in FIG. 7. The memory 212 may be a dynamic random access memory. The buffer 214 may be a portion of the dynamic random access memory, a system memory, a cache memory, or any other memory for temporarily storing information.

In one embodiment, the conversion module 202 may translate a fibre channel data to a serial ATA data (as later will be described in detail in FIG. 3). The command arbitrator 204 may answer and transmit at least some commands back to the conversion module 202 without transmitting to the optimization 206 (as later will be described in detail in FIG. 4). The optimization module 206 may receive other commands from the command arbitrator and may buffer at least some of the commands prior to sending the commands to one or more serial ATA devices 102, 104, and/or 106 (as later will be described in detail in FIG. 5).

If the serial ATA devices 102, 104, and/or 106 are not able to process (e.g., read, write, etc.) certain commands received from the optimization module 206, an error recovery module 208 of the FC/SATA translation module 110 may be used to retry transmission to one or more of the SATA devices 102, 104, and/or 106 (as later will be described in detail in FIG. 6).

Figure 3:
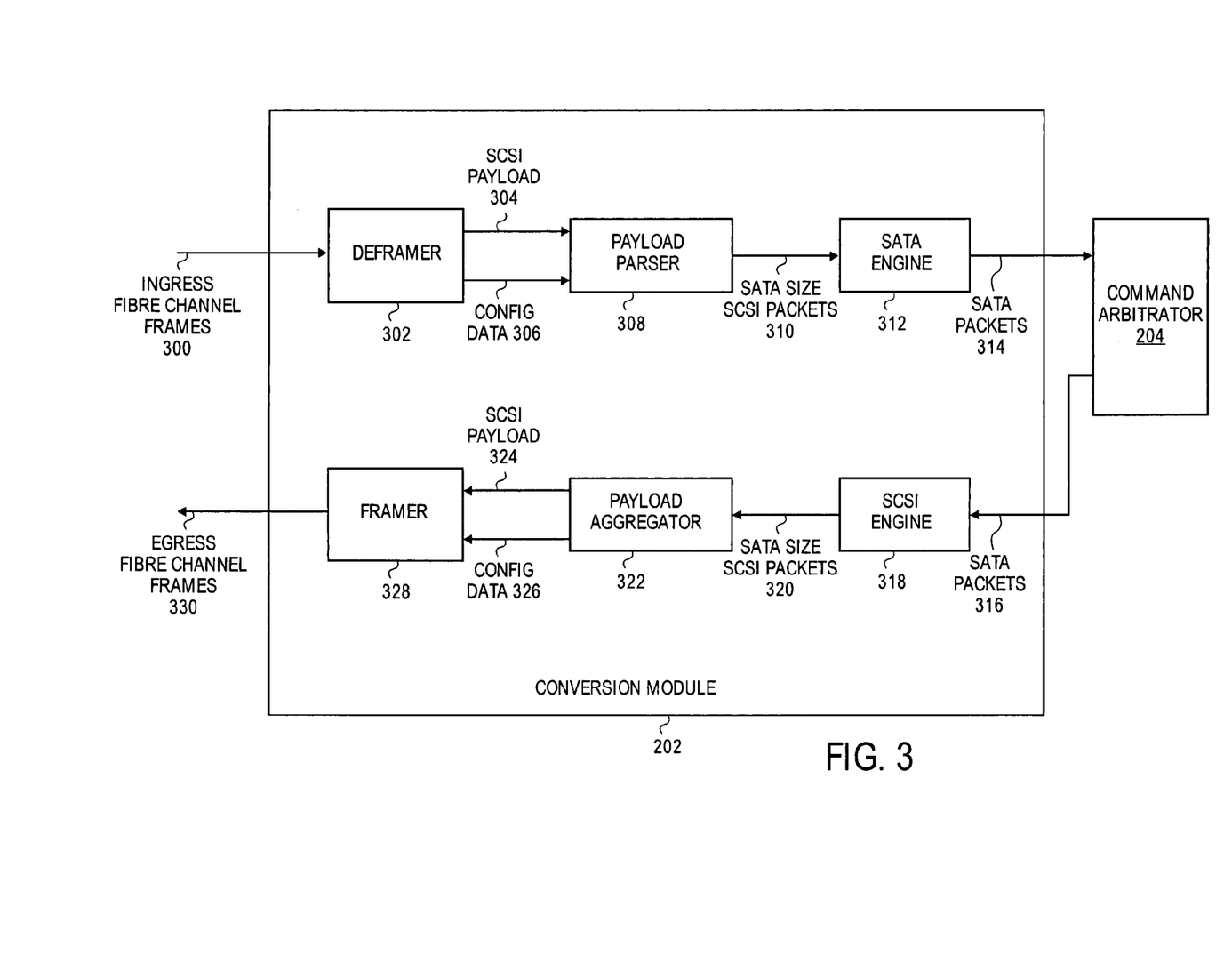
FIG. 3 is a block diagram of the conversion module of the FC/SATA translation module along with an exemplary data flow of the conversion module, according to one embodiment.

The operation of the conversion module 202 in FIG. 2 is best understood in conjunction with FIG. 3. FIG. 3 is a block diagram of an embodiment of the conversion module 202 of the FC/SATA translation module 110 along with an exemplary data flow of the conversion module 202. In FIG. 3, ingress fibre channel data (e.g., as received through ingress fibre channel frames 300) may be received into a deframer 302 of the conversion module 202. The deframer 302 may separate each ingress fibre channel frame into a SCSI payload 304 and configuration data 306 (e.g., by removing frames holding the data within the ingress fibre channel frames 300). The configuration data 306 may be data embedded within the ingress fibre channel frame such as data block size, optimal conversion speed, throughput, state information, and routing information.

A payload parser 308 receives the SCSI payload 304 and the configuration data 306 from the deframer 302. The payload parser 308 operates (e.g., parses) to break down the SCSI payload 304 into packets that are compatible with the serial ATA standard. (e.g., the serial ATA standard processes data in different sizes than the SCSI standard). For example, different commands may have different fibre channel frame sizes. Some commands within fibre channel frames (e.g., SCSI frames) can support up to 2 terabytes of data (32 bit block count, assuming each block is 512B), while some commands within SATA packets can support up to 32 megabytes of data (16 bit block count, assuming each block is 512B). Therefore, the payload parser 308 breaks down the data within the SCSI payload 304 into sizes that are understandable by the serial ATA standard (e.g., SATA size SCSI packets 310). In one embodiment, the payload parser 308 uses the configuration data 326 to determine packet boundaries of the serial ATA data and uses the configuration data 326 to determine a conversion speed for the translation to serial ATA data.

The SATA engine 312 then receives the SATA size SCSI packets 310 from the payload parser 308. The SATA engine 312 translates (e.g., by performing operations such as data conversion, data mapping, etc.) the SCSI packets within the SATA size SCSI packets 310 into SATA packets 314 and transmits out of the conversion module 202 to the command arbitrator 204.

The ingress path, described in FIG. 3 of the deframer 302, the payload parser 308, and the SATA engine 312 can also operate in reverse in an egress path, when one or more of the SATA device(s) 102, 104, and/or 106 (as shown in FIG. 1) send reply data back to one or more servers (e.g., server(s) 114 in FIG. 1). The egress path is shown by a SATA packets 316, a SCSI engine 318, a SATA size SCSI packets 320, a payload aggregator 322, a SCSI payload 324, a configuration data 326, a framer 328, and an egress fibre channel frames 330. The SCSI engine 318 receives the SATA packets 316 from the command arbitrator 204 in FIG. 3. The SCSI engine 318 operates to convert the SATA packets 316 into SATA size SCSI packets 320 (e.g., by performing operations such as reverse data conversion, reverse data mapping, etc). The SCSI engine 318 and the SATA engine 312 may use a table for referencing data components in one embodiment for performing translation.

The SATA size SCSI packets 320 are transmitted to the payload aggregator 322 which forms a SCSI payload 324 by aggregating the SCSI packets into a size that is appropriate and acceptable to the particular implementation of the SCSI standard used by the fibre channel transport (e.g., the fibre channel transport within the SAN 112 as described in FIG. 1). The payload aggregator 322 also generates configuration data 326 to be used by the framer 328 to frame the SCSI payload 324. In one embodiment, the payload aggregator 322 generates the configuration data 326 by analyzing information embedded within the SATA size SCSI packets 320.

The framer 328 receives the SCSI payload 324 and the configuration data 326 from the payload aggregator 322. The framer 328 encapsulates the SCSI payload into frames using the configuration data 326, and forms egress fibre channel frames 330. The egress fibre channel frames 330 are transmitted to a recipient based on embedded recipient information (e.g., the recipient may be the server(s) 114 in one embodiment).

Figure 4:
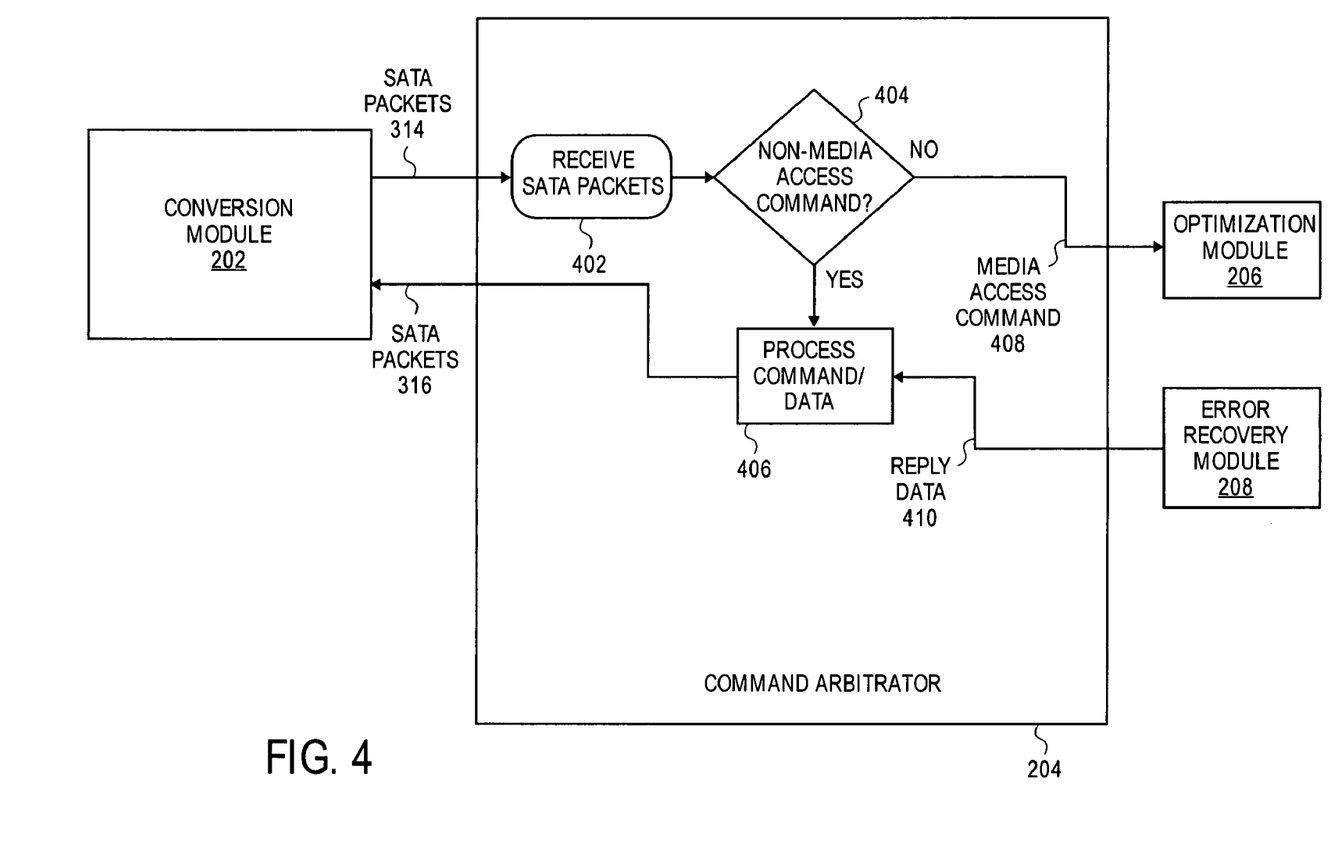
FIG. 4 is a data interaction diagram of the command arbitrator to process non-media access commands and to transmit media access commands to an optimization module, according to one embodiment.

Referring back to FIG. 2, the operation of the command arbitrator 204 in FIG. 2 and FIG. 3 is best understood in conjunction with FIG. 4. FIG. 4 is a data interaction diagram of an embodiment of the command arbitrator 204 to process non-media access commands and to transmit media access commands to an optimization module 206. In operation 402, the command arbitrator 204 receives SATA packets 314 from the conversion module 202. In one embodiment, the command arbitrator 204 may receive a group of SATA packets 314 forming a command (e.g., a command such as a write command, a read command, or a verify command).

In operation 404, the command arbitrator 204 determines whether a particular command is a media access command (e.g., a write command or a read command), or a non-media access command (e.g., a verify command). If the command is a media access command, the command arbitrator sends the media access command 408 to the optimization module 206. If the command is a non-media access command than the command arbitrator may internally determine the answer and process the command in operation 406 (e.g., through stored information of previous read/write attempts). If the command arbitrator is able to process the non-media access command (e.g., often times, the command arbitrator can process certain verify commands such as verify block commands without asking one or more of the SATA device(s) 102, 104, and/or 106 because of previous writes/reads to the particular block (s) of the serial ATA device(s) 102, 104, and/or 106 being verified). If the command arbitrator is able to internally process and answer the commands (e.g., verify commands) then SATA packets 316 are transmitted back from the command arbitrator to the conversion module 202 with reply information.

The command arbitrator 204 may also receive reply information directly from one or more of the serial ATA devices 102, 104, and/or 106 (e.g., or through the error recovery module 208 as illustrated in FIG. 4) as reply data 410. If the command arbitrator receives reply data 410, then the command arbitrator 204 passes this information directly through operation 406 back to conversion module 202 as SATA packets 316 without further processing by the command arbitrator 204. As such, in one embodiment, the command arbitrator 204 processes non-media access commands received from a transmitting server (e.g., the server(s) 114) and transmits media access commands to an optimization module 206.

Figure 5:
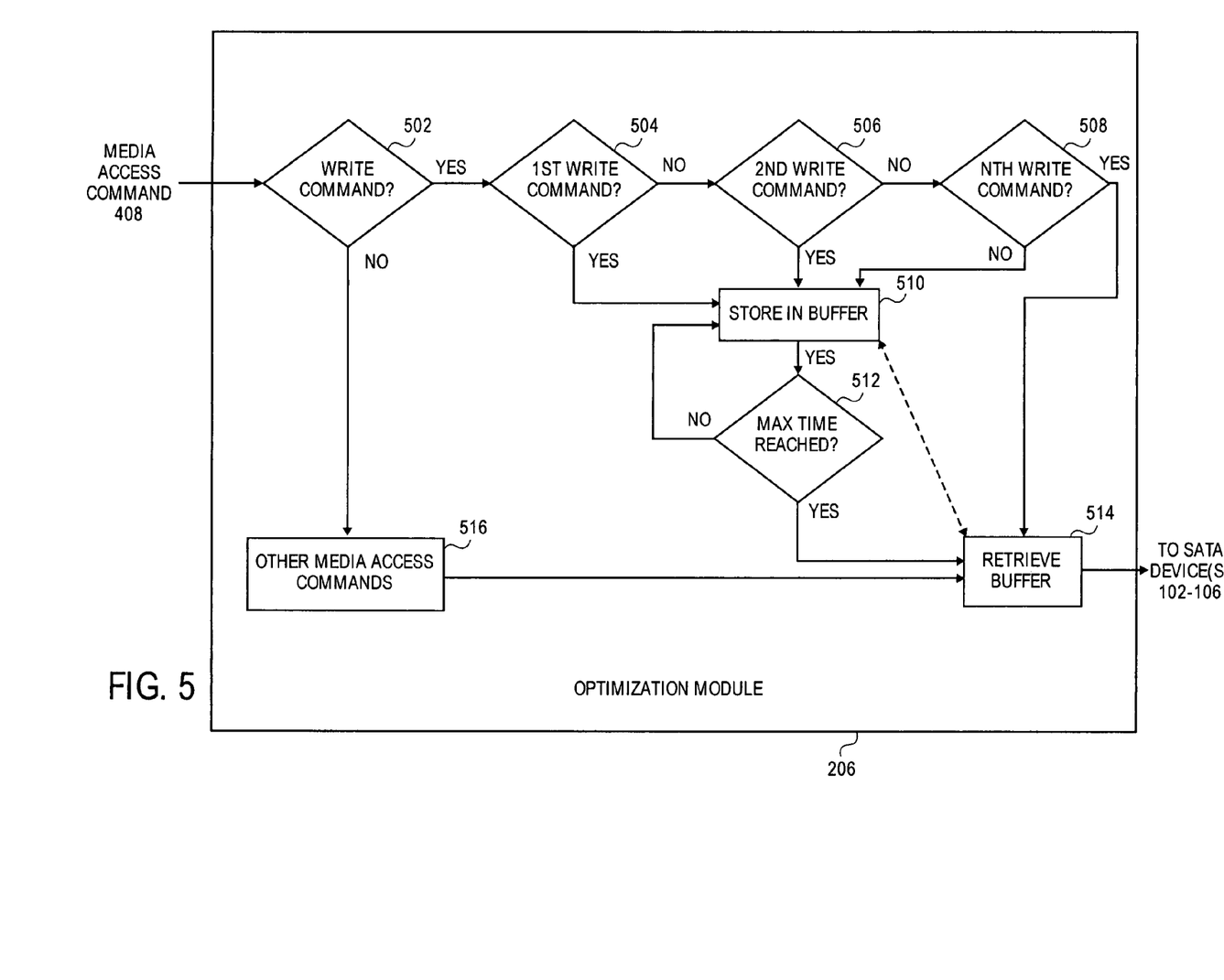
FIG. 5 is a data interaction diagram of the optimization module to buffer consecutive write commands and to transmit other media-access commands without buffering, according to one embodiment.

The operation of the optimization module 206 in FIG. 2 is best understood in conjunction with FIG. 5. FIG. 5 is a data interaction diagram of an embodiment of the optimization module 206 to buffer consecutive write commands and to transmit other media-access commands without buffering, according to one embodiment. In operation 408 of FIG. 5, the media access command 408 is received from the command arbitrator 204 of FIG. 4. The optimization module 206 determines whether the media access command 408 is a write command in operation 502. If operation 502 determines that the media access command 408 is not a write command, then the media access command 408 must be other media-access commands 516.

If the media access command 408 is a write command, the optimization module 206 determines whether the write command is a first write command in operation 504. If the write command is the first write command, the optimization module stores the first write command in a buffer in operation 510. In one embodiment, the optimization module stores the first write command in the buffer 214 of FIG. 2.

In one embodiment, the first write command may be a first consecutive write command (e.g., a first write command in a series of forthcoming consecutive write commands) that is stored within the buffer 214 for a first time interval (e.g., 3 seconds) for optimization purposes (e.g., for optimal performance and throughput of at least some of the SATA device(s) 102, 104, and/or 106). In another embodiment, the first write command is purged from the buffer and transmitted to at least one of the plurality of SATA device(s) 102, 104, and/or 106 if a second consecutive write command is not received before expiration of the first time interval (e.g., represented by the operation 512 in FIG. 5). The first time interval may be automatically calculated by the optimization module 206 based upon a periodic probing of the SATA device(s) 102, 104, and/or 106 in another embodiment.

If the write command is not the first write command, the optimization module determines whether the write command is a second consecutive write command (e.g., the second consecutive write command may be a "consecutive" write command, or a write command that immediately follows the first write command) in operation 506. If the write command is the second consecutive write command, the optimization module also stores the second consecutive write command in a buffer in operation 510, along with the already stored first write command. In one embodiment, the optimization module stores the second consecutive write command in the buffer 214 of FIG. 2.

In one embodiment, the second consecutive write command may be stored within the buffer 214 for a second time interval (e.g., 12 seconds) for optimization purposes (e.g., for optimal performance and throughput of at least some of the SATA device(s) 102, 104, and/or 106) if the first time interval (e.g., 3 seconds) has not expired (e.g., if the first time interval has expired for the first write command, then there cannot be a second consecutive write command because the first write command would have already been retrieved from the buffer in operation 514). The second time interval may be automatically calculated by the optimization module 206 based upon a periodic probing of the SATA device(s) 102, 104, and/or 106 in another embodiment.

If the write command is not the second consecutive write command, then the optimization module 206 determines whether the write command is earlier than a nth consecutive write command in operation 508 (e.g., the nth consecutive write command may be a "consecutive" write command, or a write command that immediately follows the first write command, the second consecutive write command, and all consecutive write commands up and through the n-1th consecutive write command). All commands before the nth consecutive write command may be stored within the buffer in operation 510. If the write command is the nth consecutive write command, the optimization module 206 retrieves all of the stored write commands (e.g., the first write command, the second consecutive write command, and all commands before the nth consecutive write command) from the buffer, and transmits the first write command, the second consecutive write command, and all commands up through and including the nth consecutive write command to the SATA device(s) 102, 104, and/or 106. As such, the nth consecutive write command is never stored within the buffer, while all write commands before the nth consecutive write command are stored within the buffer. In one embodiment, the nth consecutive write command is a third write command. In one embodiment, "n" is automatically determined based on the throughput, speed, performance, and location of the SATA devices 102-106.

If the media access command 408 is not a write command in operation 502, then the write command must be other media access commands 516, as mentioned earlier. As soon as other media access commands 516 are received, the optimization module 206 retrieves the buffer in operation 514, and transmits whatever is stored in the buffer (e.g., the first write command), and transmits the other media access commands to the SATA device(s) 102, 104, and/or 106. The other media-access commands 516 are not stored within a buffer, but are directly transmitted out from the optimization module 206.

If the first write command and/or the second write command and/or any write commands before the nth write command is stored in the buffer in operation 510, the buffer (e.g., buffer 214 of FIG. 2) determines whether a max time (e.g., the maximum time may be set automatically by the optimization module 206 based upon the throughput and read/write speeds of the SATA device(s) 102, 104, and/or 106) has been reached within the buffer in operation 512. If the max time has not been reached, the buffer is not purged. If the max time has been reached, the optimization module 206 retrieves whatever data is in the buffer in operation 514 and transmits the commands to the SATA device(s) 102, 104, and/or 106. After the SATA device(s) process the commands from the optimization module 206, they send reply data to the error recovery module 208 shown in FIG. 2.

Figure 6:
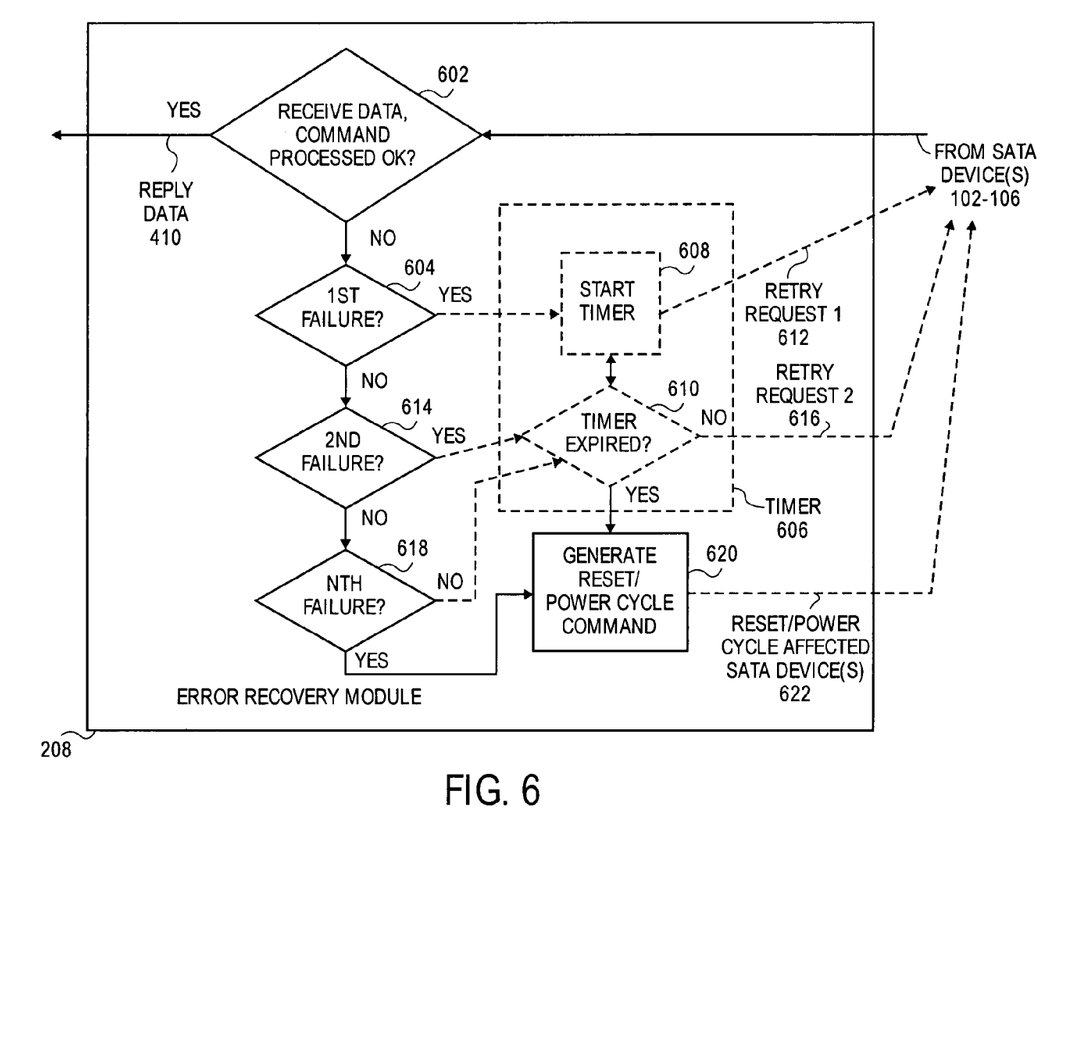
FIG. 6 is a data interaction diagram of the error recovery module, according to one embodiment.

The operation of the error recovery module 208 in FIG. 2 is best understood in conjunction with FIG. 6. FIG. 6 is an embodiment of a data interaction diagram of the error recovery module 208, according to one embodiment. One or more of the SATA device(s) 102, 104, and/or 106 receive and process data (e.g., media access commands) from the optimization module 206 as described in FIG. 5. Once the SATA device(s) 102, 104, and/or 106 process the media access commands, the reply data is received by the error recovery module 208.

The error recovery module 208 in FIG. 6 may determine whether the data (e.g., commands) sent by the optimization module 206 is processed correctly by the SATA device(s) 102, 104, and/or 106 in operation 602. If the data is processed correctly by the SATA device(s) 102, 104, and/or 106, the operation 602 may transmit reply data 410 back to the command arbitrator 204 as described previously in FIG. 4. If the data was not processed correctly by the SATA device(s) 102, 104, and/or 106, the error recovery module 208 may determine whether the failed command (e.g., failed media access command) was a first failure in operation 604. If the operation was a first failure in operation 604, the error recovery module 208 may start a timer 606 within the error recovery module in operation 608. The error recovery module 208 then transmits a first retry request 612 back to the SATA device(s) 102, 104, and/or 106 that was unable to process the original command from the optimization module 206.

If the command fails again, the error recovery module 208 may determine whether the command failed for a second time in operation 614. If the command failed for a second time, the error recovery module 208 may determine whether the timer 606 has expired in operation 610. If the timer 606 has not expired, operation 610 generates a second retry request 616. Similarly, subsequent retry requests are generated until the nth failure. Until the nth failure, new retry requests (not shown) are generated by the error recovery module 208 after the error recovery module determines whether the timer expired in operation 610.

If the command fails for an nth time in operation 618 (e.g., a third time, a fourth time, or any other time set by a user and/or automatically determined by the FC/SATA translation module 110 based on optimization characteristics of SATA devices 102, 104, and/or 106), or if the timer has expired in operation 610 after the second failure 614 or any failure before the nth failure, the error recovery module 208 may generate a reset/power cycle command in operation 620 and may transmit the reset/power cycle command to a failing serial ATA device (e.g., the particular serial ATA drive or drives that is unable to process one or more media access commands sent by the optimization module 206 of FIG. 5) of the SATA device(s) 102, 104, and/or 106. In one embodiment, the nth failure 618 is a third failure that follows the second failure 614. In another embodiment, a power cycle command is generated by the error recovery module 208 to power down the failing serial ATA device of the SATA devices 102, 104, and/or 106 after the nth failure and/or after the timer has expired. Alternatively, the error recovery module 208 may generate a reset command to restart the failing serial ATA device of the SATA devices 102, 104, and/or 106 after the nth failure and/or after the timer has expired.

Figure 7:
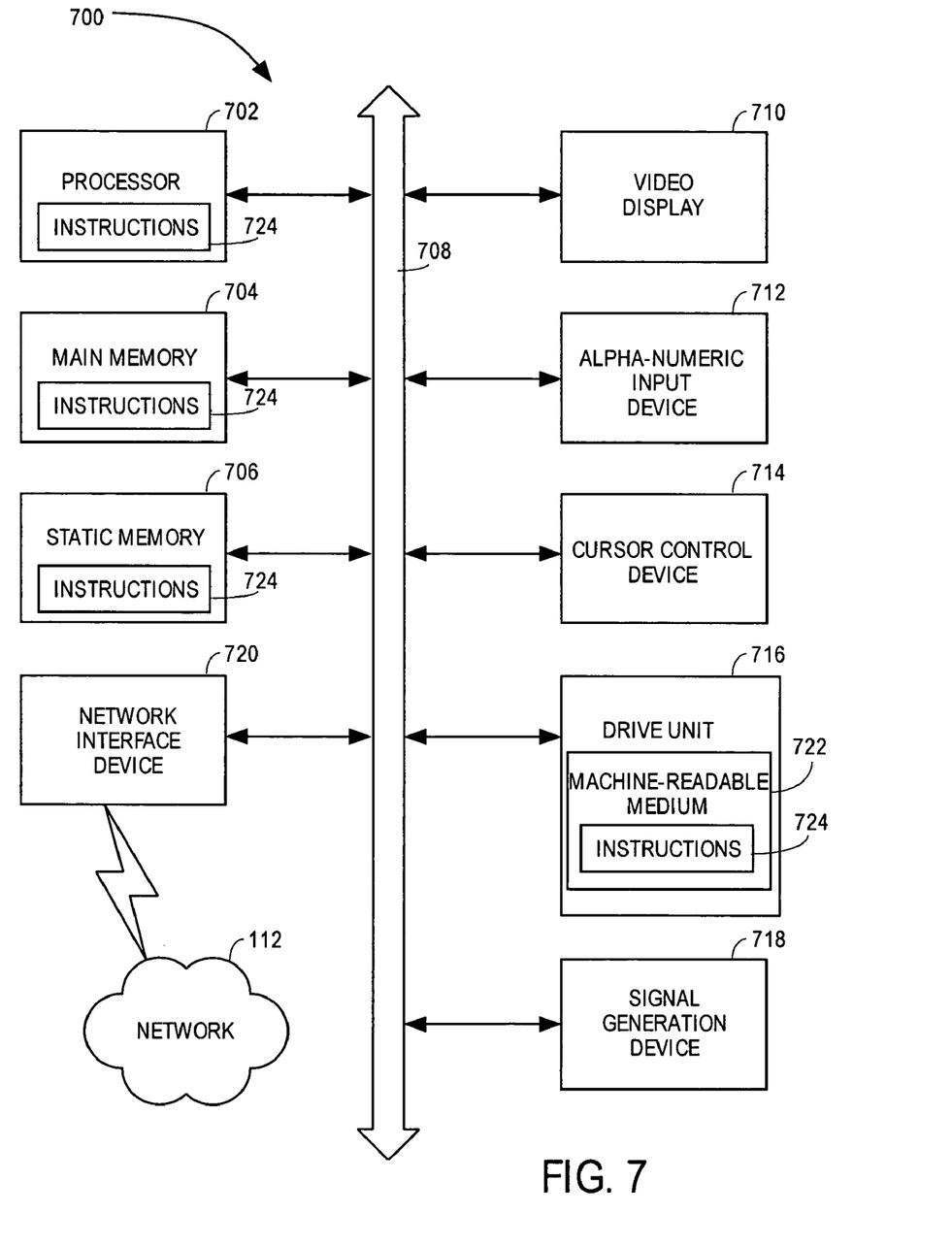
FIG. 7 is a diagrammatic representation of a machine in the exemplary form of a computer system, according to one exemplary embodiment.

FIG. 7 shows a diagrammatic representation of a machine in the exemplary form of a computer system 700 within which a set of instructions, for causing the machine to perform any one or more of the methodologies discussed above, may be executed. In various embodiments, the machine operates as a standalone device or a connected (e.g., networked) device, coupled to other machines. In a networked deployment, the machine may operate in the capacity of a server (e.g., such as one or more of servers(s) 116 in FIG. 1) or a client machine in a server-client or server-storage network environment (e.g., such as the SAN 112 in FIG. 1), or as a peer machine in a peer-to-peer (or distributed) network environment. The machine may be a server computer, a client computer, a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a CPU), a main memory 704 and a static memory 706, which communicates with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720. It should be noted that the architecture of the computing system of FIG. 7 is just one of many different computing system architectures that may be used.

The disk drive unit 716 includes a machine-readable medium 722 on which is stored one or more sets of instructions (e.g., software instructions 724) embodying any one or more of the methodologies or functions described herein. The software instructions 724 may also reside, completely or at least partially, within the main memory 704 and/or within the processor 702 during execution thereof by the computer system 700, the main memory 704 and the processor 702 also constituting machine-readable media. The software instructions 724 may further be transmitted or received over a network 104 via the network interface device 720.

While the machine-readable medium 722 in FIG. 7 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The term "machine-readable medium" shall accordingly be taken to include, but not be limited to, solid-state memories, optical and magnetic media, and carrier wave signals.

It should be noted that the various modules described herein may be performed within hardware circuitry as well as in software. It should be noted that FC/SATA translation module 110 can be implemented with one or more semiconductor devices including circuitry such as logic circuitry to perform its various functions as described above. In some embodiments, hardware circuitry may provide speed and performance advantages over software implementations of the FC/SATA translation module 110. In other embodiments, software implementations may be preferred. In one embodiment, a conversion module circuit may be built to translate a fibre channel data to a serial ATA data. In one embodiment, a FC/SATA translation circuit (e.g., a hardware logic circuit built using gates, transistors, and logic circuitry) can perform the functions of the FC/SATA translation module 110, and can be built with semiconductor circuitry (e.g., logic circuitry such as CMOS based circuitry). A semiconductor chip may implement the functions (e.g., as described in FIG. 2 thru FIG. 6) described within the FC/SATA translation module 110 in one embodiment using logic gates, transistors, and hardware logic circuitry associated with implementing the design.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

The invention claimed is:

1. A system, comprising:
   a network;
   a plurality of servers and a plurality of fibre channel devices connected to each other through the network; and
   a controller connected to the network having a translation module to convert fibre channel frames received through the network from one or more of the plurality of servers into SATA packets; and
   a plurality of serial ATA devices coupled to the network through the controller to receive the SATA packets.

2. The system of claim 1, further comprising a command arbitrator to answer at least one non-media access command received from a transmitting server of the plurality of servers.

3. The system of claim 2, wherein the command arbitrator to transmit a set of media access commands to an optimization module.

4. The system of claim 3, further comprising a buffer of the optimization module to store a first consecutive write command of the set of media access commands for a first time interval and a second consecutive write command of the set of media access commands for a second time interval if the first time interval has not expired.

5. The system of claim 4, wherein the optimization module to transmit other media-access commands of the set of media access commands to at least one of the plurality of serial ATA devices without storing in the buffer.

6. The system of claim 4, wherein the buffer is optimized based upon the throughput and performance of at least some of the plurality of serial ATA devices.

7. The system of claim 4, wherein the first consecutive write command is purged from the buffer and transmitted to at least one of the plurality of serial ATA devices if the second consecutive write command is not received before expiration of the first time interval.

8. The system of claim 7, wherein the first time interval is automatically optimized based on the performance of the plurality of serial ATA devices.

9. The system of claim 1, further comprising an error recovery module to generate and transmit at least a first retry request of a failed command to at least one of the plurality of serial ATA devices and to start a timer of the error recovery module.

10. The system of claim 9, further comprising a nth retry request generated by the error recovery module if the timer has not expired and the at least the first retry request is unsuccessful.

11. The system of claim 10, further comprising a reset command generated by the error recovery module if the nth retry request is unsuccessful.

12. A method, comprising:
    deframing a fibre channel data received from a network into a SCSI payload;
    parsing the SCSI payload into SATA size SCSI data; and
    translating the SATA size SCSI data into SATA packets.

13. The method of claim 12, further comprising:
    translating the SATA packets into the SATA size SCSI data;
    aggregating the SATA size SCSI data into the SCSI payload; and
    framing the SCSI payload into the fibre channel data.

14. The method of claim 12, further comprising answering at least one non-media access command received through the network from a sending device without forwarding to a serial ATA device.

15. The method of claim 14, further comprising transmitting a set of media access commands to an optimization module.

16. The method of claim 15, further comprising buffering a first consecutive write command of the set of media access commands for a first time interval and buffering a second consecutive write command of the set of media access commands for a second time interval if the first time interval has not expired.

17. The method of claim 16, further comprising transmitting other media-access commands of the set of media access commands to at least one of a plurality of serial ATA devices without storing in the buffer.

18. The method of claim 16, further comprising purging the first consecutive write command from the buffer and transmitting the first consecutive write command to at least one of a plurality of serial ATA devices if the second consecutive write command is not received before expiration of the first time interval.

19. The method of claim 18, further comprising automatically optimizing the first time interval based on the performance of the plurality of serial ATA devices.

20. The method of claim 12, further comprising generating a first retry request of a failed command to at least one of the plurality of serial ATA devices; initiating a timer of the error recovery module; and transmitting the first retry request to the at least one of the plurality of serial ATA devices.

21. The method of claim 20, further comprising generating a second retry request by the error recovery module if the timer has not expired and the first retry request is unsuccessful.

22. The method of claim 21, further comprising generating a reset command by the error recovery module if the second retry request is unsuccessful.

23. A system, comprising:
a conversion module to translate a fibre channel data to a serial ATA data; and
a command arbitrator to process and to send at least some of the serial ATA data to the conversion module without transmitting to one or more serial ATA devices and to transmit other serial ATA data to an optimization module, the optimization module to buffer at least some of the other serial ATA data prior to sending the other serial ATA data to one or more serial ATA devices.

24. The system of claim 23, further comprising an error recovery module to receive data from the one or more serial ATA devices and to generate a reset command for at least some of the one or more serial ATA devices when the one or more serial ATA devices is unable to process the other serial ATA data after n attempts or before a timer of the error recovery module expires.

25. The system of claim 23, wherein the conversion module to use a configuration data of the fibre channel data to determine packet boundaries of the serial ATA data and to use the configuration data to determine a conversion speed for the translation to serial ATA data.

26. A machine-readable medium storing a set of instructions that, when executed by the machine, cause the machine to perform a method, the method comprising:
translating a fibre channel command into a serial ATA command;
communicating the serial ATA command to at least one of a set of serial ATA devices if the serial ATA command is a media-access command; and
answering the serial ATA command if the command is a non-media access command without transmitting the command to the set of serial ATA devices.

27. The machine-readable medium of claim 25, further comprising optimizing the media access command by buffering a first write command for a first time interval and buffering a second consecutive write command for a second time interval prior to transferring the first write command and the second write command to at least one of the set of serial ATA devices.

28. A machine-readable medium storing a set of instructions that, when executed by the machine, cause the machine to perform a method, the method comprising:
deframing a fibre channel data received from a network into a SCSI payload;
parsing the SCSI payload into SATA size SCSI data; and
translating the SATA size SCSI data into SATA packets.

29. The machine-readable medium of claim 28, further comprising:
translating the SATA packets into the SATA size SCSI data;
aggregating the SATA size SCSI data into the SCSI payload; and
framing the SCSI payload into the fibre channel data.

30. A system, comprising:
a processor;
a translation module connected to the processor having,
means for deframing a fibre channel data received from a network into a SCSI payload,
means for parsing the SCSI payload into SATA size SCSI data, and
means for translating the SATA size SCSI data into SATA packets.

* * * * *